United States Patent
Katzenberger et al.

(10) Patent No.: US 9,534,983 B2
(45) Date of Patent: Jan. 3, 2017

(54) METHOD FOR DETERMINING THE IDLE TRAVEL OF A PIEZO-INJECTOR WITH A DIRECTLY ACTUATED NOZZLE NEEDLE

(75) Inventors: Michael Katzenberger, Regensburg (DE); Manfred Kramel, Mintraching (DE); Nicolas Nozeran, Tegernheim (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 295 days.

(21) Appl. No.: 14/004,159

(22) PCT Filed: Feb. 29, 2012

(86) PCT No.: PCT/EP2012/053461
§ 371 (c)(1),
(2), (4) Date: Nov. 18, 2013

(87) PCT Pub. No.: WO2012/119909
PCT Pub. Date: Sep. 13, 2012

(65) Prior Publication Data
US 2014/0060488 A1  Mar. 6, 2014

(30) Foreign Application Priority Data
Mar. 9, 2011 (DE) .................. 10 2011 005 285

(51) Int. Cl.
*F02M 65/00* (2006.01)
*G01M 15/04* (2006.01)
(Continued)

(52) U.S. Cl.
CPC .......... *G01M 15/04* (2013.01); *F02D 41/2096* (2013.01); *F02D 41/247* (2013.01);
(Continued)

(58) Field of Classification Search
CPC ... G01M 15/04; F02D 41/2096; F02D 41/247; F02M 65/05; F02M 65/005; H02N 2/065; H02M 51/0603
(Continued)

(56) References Cited

U.S. PATENT DOCUMENTS 6,166,659 A    12/2000  Kusano ................... 340/928
6,499,464 B2 *  12/2002  Rueger ............... F02D 41/2096
                                                    123/446
(Continued)

FOREIGN PATENT DOCUMENTS

CN    101018945 A    8/2007    ............. F02M 65/00
CN    101409015 A    4/2009    ............... G08G 1/01
(Continued)

OTHER PUBLICATIONS

International Search Report and Written Opinion, Application No. PCT/EP2012/053461, 12 pages, Jun. 22, 2012.
(Continued)

*Primary Examiner* — Erick Solis
(74) *Attorney, Agent, or Firm* — Slayden Grubert Beard PLLC

(57) ABSTRACT

A method is disclosed for determining the idle travel of a piezo-injector which has a piezo-actuator and a nozzle needle which is activated directly by the piezo-actuator. A test pulse is applied to the piezo-actuator, which pulse brings about a continuous increase in the piezo-travel. The time period is measured which passes between the starting of the test pulse and the time when the idle travel is overcome. The idle travel of the piezo-injector is then determined from the measured time period.

11 Claims, 2 Drawing Sheets

(51) Int. Cl.
*F02D 41/20* (2006.01)
*F02D 41/24* (2006.01)
*H02N 2/06* (2006.01)
*F02M 51/06* (2006.01)

(52) U.S. Cl.
CPC .......... *F02M 65/005* (2013.01); *H02N 2/065* (2013.01); *F02M 51/0603* (2013.01)

(58) Field of Classification Search
USPC .................................. 701/103, 114; 123/456
See application file for complete search history.

(56) References Cited

U.S. PATENT DOCUMENTS

| | | | | |
|---|---|---|---|---|
| 7,034,437 | B2 * | 4/2006 | Fukagawa | H01L 41/042 |
| | | | | 310/316.03 |
| 7,406,861 | B2 | 8/2008 | Jung et al. | 73/114.51 |
| 7,406,952 | B2 * | 8/2008 | Frank | F02D 41/2096 |
| | | | | 123/498 |
| 7,578,280 | B2 * | 8/2009 | Fujii | F02D 41/2096 |
| | | | | 123/299 |
| 7,709,996 | B2 * | 5/2010 | Hauser | F02D 41/2096 |
| | | | | 310/316.03 |
| 2008/0028843 | A1 * | 2/2008 | Dietl | F02D 41/2096 |
| | | | | 73/114.45 |
| 2008/0265805 | A1 * | 10/2008 | Pirkl | F02D 41/2096 |
| | | | | 318/116 |
| 2009/0038590 | A1 * | 2/2009 | Fukushima | F02D 41/2096 |
| | | | | 123/494 |

FOREIGN PATENT DOCUMENTS

| | | | |
|---|---|---|---|
| CN | 1266248 A | 9/2009 | ............. G07B 15/00 |
| DE | 19905340 A1 | 8/2000 | ............. F02D 41/20 |
| DE | 10319530 A1 | 11/2004 | ............. F02D 41/20 |
| WO | 2008/022951 A1 | 2/2008 | ............. F02D 41/20 |
| WO | 2009/138422 A1 | 11/2009 | ............. F02D 41/20 |
| WO | 2012/119909 A1 | 9/2012 | ............. F02D 41/20 |

OTHER PUBLICATIONS

Chinese Office Action, Application No. 201280012356.6, 14 pages, Apr. 21, 2015.
Chinese Office Action, Application No. 201280012356.6, 13 pages, Dec. 22, 2015.
Chinese Office Action, Application No. 201280020174.3, 6 pages, May 5, 2016.

* cited by examiner

METHOD FOR DETERMINING THE IDLE TRAVEL OF A PIEZO-INJECTOR WITH A DIRECTLY ACTUATED NOZZLE NEEDLE

CROSS-REFERENCE TO RELATED APPLICATIONS

This application is a U.S. National Stage Application of International Application No. PCT/EP2012/053461 filed Feb. 29, 2012, which designates the United States of America, and claims priority to DE Application No. 10 2011 005 285.2 filed Mar. 9, 2011, the contents of which are hereby incorporated by reference in their entirety.

TECHNICAL FIELD

This disclosure relates to a method for ascertaining the idle stroke of a piezo-injector having a directly actuated nozzle needle.

BACKGROUND

A piezo-injector of this type is used in connection with the fuel injection process in motor vehicles, in particular in motor vehicles that comprise a common-rail fuel injection system.

A piezo-injector of this type comprises a piezo-actuator and a nozzle needle that is actuated by said piezo-actuator. The piezo-actuator that is embodied in the form of a piezo-stack represents a capacitive load and it can be extended by means of being charged to an electrical voltage that amounts for example to 150V. In the case of a directly driven fuel injection system, this piezo-actuator can be used to transmit the piezo-movement and/or the piezo-force to the nozzle needle by way of reversing the effective direction, for example using a lever.

During the charging phase of the piezo-actuator for the purpose of opening the nozzle needle, an idle stroke is initially overcome and only then is the nozzle needle opened. The term "idle stroke" or "idle travel" describes the distance over which the piezo-actuator must extend to a great extent in a force free manner prior to the force becoming effective on the nozzle needle. It is necessary in dependence upon the system pressure for the drive unit to overcome a defined force in order to raise the nozzle needle from its needle seat. The movement of the piezo-actuator is then transmitted to the movement of the nozzle needle.

The idle stroke has consequently a decisive influence on the point in time at which the nozzle needle rises from its needle seat.

In known injection concepts, it is necessary to place high demands on the components in order to minimize the unavoidable effects of manufacturing tolerances on said components. Irrespective of this, in addition, comprehensive influence analyses and calibration processes are performed, during which the respective concept behavior is ascertained and any effects of manufacturing tolerances are compensated for during the serviceable life of the component.

Furthermore, in the case of known injector control concepts, it is possible to monitor the respective desired injection fuel quantity by means of transmitting electrical feedback signals, which transmission is possible as a result of said nozzle needle being directly coupled to the piezo-actuator, and where necessary to compensate for any changes in the idle stroke.

A disadvantage of the abovementioned option resides in the fact that, for example, when the engine is in the coasting mode in which fuel is not being injected, it is not possible to observe any change in the idle stroke as in this case there is no feedback with regard to the needle position. As a consequence, as the fuel injection process is re-instated, several injection cycles are initially required in order to be able to ensure an acceptably accurate detection of the needle position, which is in turn a prerequisite for compensating any changes that occur in the idle stroke. A temperature model of the piezo-injector can have a supporting effect during this process. However, even in this case, it cannot be sufficiently guaranteed that the accuracy of the fuel injection quantity is ensured.

In the case of in-line injectors, the positions of the components, drive unit and nozzle needle change greatly in particular as a result of thermal expansion. This renders it necessary to continuously correct the fuel injection quantity. A prerequisite of this continuous correction is that the idle stroke of the piezo-injector is ascertained precisely.

SUMMARY

One embodiment provides a method for determining an idle travel of a piezo-injector that comprises a piezo-actuator and a nozzle needle that is directly actuated by the piezo-actuator, the method comprising: applying a test pulse to the piezo-actuator that produces a continuous increase of a piezo stroke of the piezo-actuator, measuring the time period that passes between a commencement of the test pulse and a point at which the idle travel is overcome, and determining the idle travel of the piezo-injector based on the measured time period.

In a further embodiment, the method comprises determining a magnitude of the test pulse such that it does not produce a needle stroke within a predefined duration of the test pulse, and applying the test pulse with the determined magnitude.

In a further embodiment, the method comprises applying the test pulse using a high-impedance current source.

In a further embodiment, the high-impedance current source is provided in a control device of a motor vehicle.

In a further embodiment, the method comprises obtaining voltage values from the measured time period using a database, and using the obtained voltage values to control the piezo-actuator during a subsequent fuel injection process.

In a further embodiment, the database is stored in a non-volatile manner in a storage device during the course of manufacturing the motor vehicle.

In a further embodiment, the method comprises the database stores a plurality of time periods and a respective allocated voltage value for each of a plurality of predefined system pressure values.

BRIEF DESCRIPTION OF THE DRAWINGS

Example embodiments or aspects of the invention are discussed in detail below with reference to the figures, in which.

DETAILED DESCRIPTION

Some embodiments provide a method for ascertaining the idle stroke of a piezo-injector, by means of which method the idle stroke of the piezo-injector can be ascertained as precisely as possible, and a corresponding control system of an injection system for performing such method.

In accordance with disclosed embodiments, in order to ascertain the idle stroke of a piezo-injector that comprises a piezo-actuator and a nozzle needle that is directly actuated by the piezo-actuator a test pulse is applied to the piezo-actuator, which test pulse causes a continuous increase of the piezo stroke, the length of time between the commencement of the test pulse and the point in time at which the idle stroke is overcome is measured, and conclusions regarding the idle stroke of the piezo-injector are drawn from the measured length of time.

Possible advantages of a method of this type reside in particular in the fact that it is possible in all operating modes of the fuel injection system to observe a change and/or displacement of the idle stroke. This advantage is achieved essentially by virtue of the fact that a test pulse is generated, which test pulse, although it does not cause fuel to be injected, does nonetheless render it possible to ascertain precisely the idle stroke.

Figure 1:
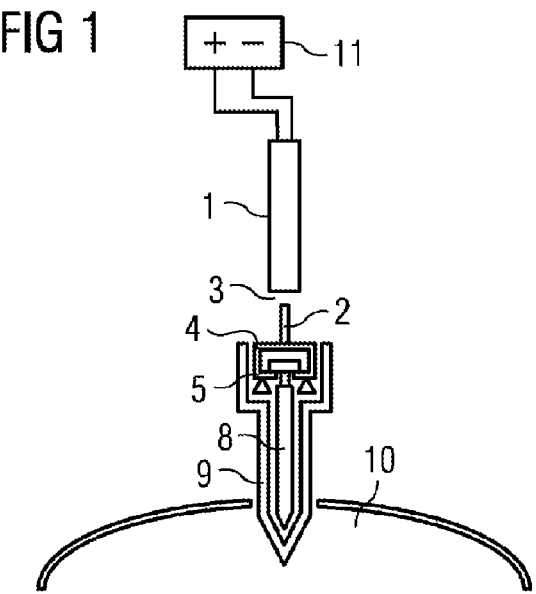
FIG. 1 is a sketch for explaining the mode of operation of a directly driven piezo-injector.
Figure 2:
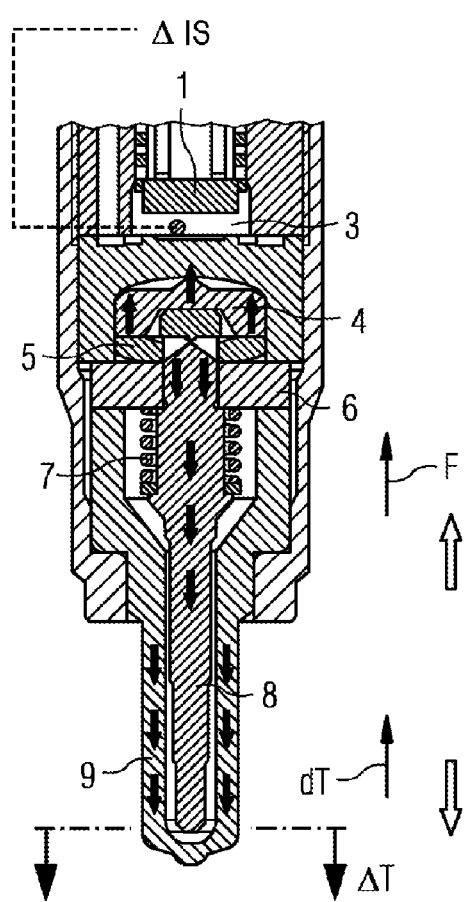
FIG. 2 is a sketch for illustrating a change in the idle stroke in the case of a directly driven piezo-injector.

FIGS. 1 and 2 illustrate sketches for explaining the mode of operation of a directly driven piezo-injector. The illustrated piezo-injector comprises a piezo-actuator 1, a pin and/or a push rod 2, a cap 4, a lever 5, an intermediate washer 6, a nozzle needle spring 7, a nozzle needle 8 and a nozzle body 9, of which components the intermediate washer and the nozzle needle spring are not illustrated in FIG. 1. The tip of the nozzle body 9 protrudes into a combustion chamber 10 of the motor vehicle.

The piezo-actuator 1 comprises a plurality of individual thin layers that expand when an electrical current is applied by means of a current source 11, in other words said thin layers convert an applied electrical voltage into a mechanical effect and/or energy. Conversely, mechanical influences of the piezo-actuator produce electrical signals that can be measured. The extent to which a piezo-actuator can expand is dependent upon parameters that include its nominal length, the number of its layers, the strength of the polarization achieved and the ratio of its active surface with respect to its entire surface. If a piezo actuator is charged, then it remains at its achieved level of expansion for the duration of the respective fuel injection process.

The exemplary embodiment illustrated in FIG. 1 is a piezo-injector, wherein the nozzle needle 8 is directly driven by means of the piezo-actuator 1. For this purpose, the piezo-actuator 1 is connected directly to the nozzle needle 8 by way of the pin 2, the cap 4, the lever 5 and the intermediate washer 6, all of which form a rigid coupling element that is guided in a positive-locking manner. The needle movement can apply a reactive force to the piezo-actuator as a result of the nozzle needle being directly connected to the piezo-actuator. Each application of force on the piezo-actuator manifests itself in a change in the measured capacity.

The nozzle body 9 expands in dependence upon the temperature. The purpose of the nozzle needle spring 7 is to hold the nozzle needle 8 in its seat. The said expansion of the nozzle body 9 in the direction of its longitudinal axis, the so-called nozzle elongation, influences the maximum needle stroke. The rail pressure that prevails in the rail, not illustrated, also causes an elongation of the nozzle body and a deformation of the nozzle needle.

The piezo-actuator 1 is initially charged by virtue of said piezo-actuator being energized during a needle opening procedure. After an idle stroke 3 has been overcome, the expansion of the piezo-actuator 1 is transmitted to the cap 4 by way of the pin 2. The cap 4 presses on both sides in a symmetrical manner on the lever 5 that forms a lever pair. These levers roll on the intermediate washer 6 in a similar manner to a rocker. The respective contact point of the two levers lies in a notch in the nozzle needle 8.

The axial compressive force of the piezo-actuator 1 is transmitted to the nozzle needle 8 by means of the above-described mechanism. The nozzle needle is raised from its seat as soon as the lifting force is greater than the sum of the resilient force and of the hydraulic force and the elasticity of the nozzle body 9 no longer ensures that the needle seat follows the nozzle needle.

After a defined distance of for example 100 μm, that is covered when the pressure is 200 MPa, the needle impacts against the intermediate washer. A contact force builds up that reacts on the piezo-actuator 1.

It is possible using piezo-actuators 1 of this type to raise the nozzle needle 8 only partially from its seat and to hold it in the so-called part-stroke position. The through-flow cross-section that is revealed between the nozzle needle and the nozzle body is smaller than the sum of the cross-sections of all the nozzle apertures.

As explained above, in the case of the piezo-injector illustrated in FIG. 1, the piezo-actuator 1 acts directly on the nozzle needle 8 by way of rigid coupling elements 2, 4, 5, 6 and conversely. As a consequence, it is possible to ascertain the effects of force on the nozzle needle 8 by means of measuring the electrical voltage at the piezo-actuator 1. A piezo-actuator has the characteristic that it remains in a state of expansion, which is achieved as a result of the electrical charge, at least for as long as is necessary for the prevailing fuel injection process.

It is further stated above that in the case of a directly driven piezo-injector it is possible to operate said piezo-injector in a part-stroke operation in which the nozzle needle is raised only a part of the maximum possible distance from the needle seat and remains there.

During the operation of the above-described piezo-injector, the idle stroke 3 changes and/or is displaced in the event of large changes in temperature. For example, a large temperature change of this type occurs in the combustion chamber 10. The transfer of the combustion chamber temperature to the piezo-injector is performed by way of its nozzle tips that protrude in part into the combustion chamber. The following reaction chain occurs:

the nozzle body 9 extends in the axial direction and/or in the direction towards the combustion chamber 10,
the nozzle needle 8 follows the nozzle tip,
the lever 5 transfers the movement upwards to the cap 4,
the cap 4 is moved in the direction towards the piezo-actuator 1,
as a result of a movement of the cap 4, the pin 2 is also moved in the direction towards the piezo-actuator 1,
the idle stroke 3 is consequently smaller.

FIG. 2 is a sketch for illustrating this type of change in the idle stroke.

The symbol ΔT and the downwards directed arrows represented in the nozzle body 9 illustrate that the nozzle body 9 extends in the presence of heat. The likewise downwards directed arrows in the nozzle needle 8 illustrate that the nozzle needle 8 in the non-actuated mode follows the nozzle tip. The arrow F illustrates that by means of converting the force on the part of the lever 5, the cap 4 is moved upwards in the direction towards the piezo-actuator 1, so that the idle stroke 3 is reduced. This reduction of the idle stroke is indicated in FIG. 2 by the symbol ΔIS. It follows from this that the resultant idle stroke is dependent upon the temperature difference between the nozzle needle 8 and the nozzle body 9.

The idle stroke is measured on the basis of generating a test pulse, which test pulse, although it does not cause fuel to be injected, does nonetheless render it possible to ascertain precisely the idle stroke.

For this purpose, a low constant current is applied to the piezo-actuator 1 by means of the current source 11 which is a high-impedance current source. A continuous rise in voltage is generated by means of this constant current, as a consequence of which a continuous piezo stroke similar to the voltage ramp is produced. The piezo unit functions in the region of the idle stroke only against the prevailing force that acts on the piezo-actuator 1 by way of the pin 2. Unless additional force is exerted, the prevailing force remains constant and can be eliminated from the calculation in a further subsequent process. As soon as the idle stroke is overcome and the piezo-actuator 1 impacts against the cap 4 by way of the pin 2, the force being exerted increases. This causes a speed change in the piezo-actuator. This is due to the rigidity of the piezo unit and means that the stroke remains almost constant and furthermore an internal force is built up inside the piezo-actuator, which force is sufficient to raise the nozzle needle from its seat.

Figure 3:
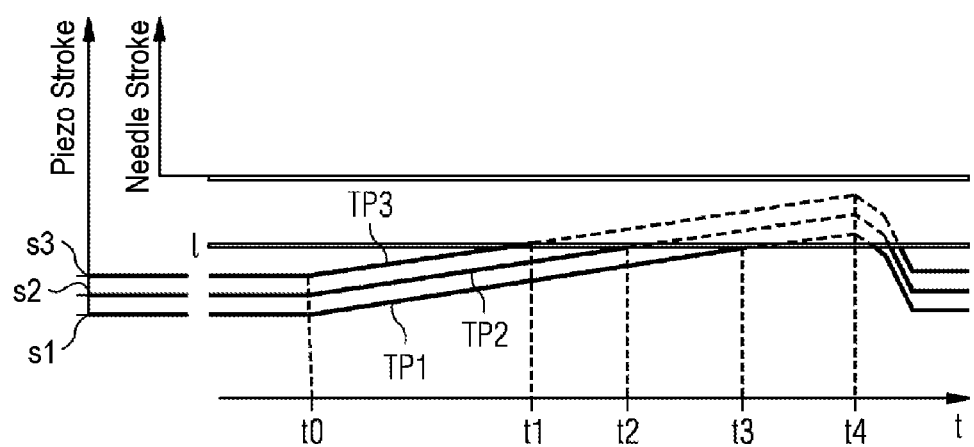
FIG. 3 is a diagram for illustrating the process in which the idle stroke is ascertained using a test pulse.

FIG. 3 is a diagram for illustrating the process of ascertaining the idle stroke using a test pulse. The needle stroke is plotted along the y-axis in the upper part of the diagram and the piezo stroke is plotted along the y-axis in the lower part of the diagram. The time t is plotted in each case along the x-axis. Stroke values s1, s2 and s3 are indicated on the axis that is describing the piezo stroke, said values being characteristic for different values of the idle stroke and being available in the non-controlled mode of the piezo-actuator. Test pulses TP1, TP2 and TP3 and their effects on the piezo stroke are illustrated on the right-hand side of the lower part of the diagram.

The test pulse TP1 commences at a point in time t0 starting from an idle stroke value s1 and produces a continuous piezo stroke along a voltage ramp that intersects a line 1, illustrated in FIG. 3, at a point in time t3. This line 1 is characteristic for the particular point in time at which the piezo-actuator 1 impacts against the pin 2. This time interval between t0 and t3 characterizes the idle stroke s1.

The test pulse TP2 likewise commences at the point in time t0, however, it starts from an idle stroke value s2 and produces a continuous piezo stroke along a voltage ramp that intersects the line 1, illustrated in FIG. 3, at a point in time t2. This line 1 is characteristic for the point in time at which the piezo-actuator 1 impacts against the pin 2. The time interval between t0 and t2 characterizes the idle stroke s2.

The test pulse TP3 commences in turn at the point in time t0, however, it starts from an idle stroke value s3 and produces a continuous piezo stroke along a voltage ramp that intersects the line 1, illustrated in FIG. 3, at a point in time t1. This line 1 characterizes the particular point in time at which the piezo-actuator 1 impacts against the pin 2. The time interval between t0 and t1 characterizes the idle stroke s3.

The point in time t4, illustrated in FIG. 3, characterizes the end of the respective test pulse. As is evident from FIG. 3, the duration of the test pulse is selected to be of such a magnitude that under no circumstances does it produce a needle stroke.

The time interval between the commencement of the test pulse and the point in time at which the test pulse intersects the line 1 is characteristic for the respective prevailing idle stroke. The greater the respective idle stroke, the longer it takes after the commencement of the test pulse to arrive at the intersection line 1. Conclusions regarding the extent of the idle stroke can therefore be drawn from knowing how long it takes the test pulse to arrive at the intersection line 1.

In dependence upon the respective ascertained period of time and consequently in dependence upon the respective idle stroke, voltage values are output using a database that has been produced in advance and is stored in the motor vehicle, in which database the system pressure is also taken into consideration, by means of which voltage values the piezo-actuator is subsequently controlled and consequently a subsequent fuel injection process is performed.

This is of advantage particularly when re-instating the fuel injection process after the termination of an engine coasting phase, because the disclosed method renders it possible after an engine coasting phase to inject the desired fuel injection quantity precisely even with the first injection of fuel and onwards.

This is explained with reference to FIG. 4 which shows a diagram for illustrating the influence of an adjustment of the correcting variables for a subsequent fuel injection process. The graph G1 is allocated to the test pulse TP1 illustrated in FIG. 3, the graph G2 is allocated to the test pulse TP2 illustrated in FIG. 3 and the graph G3 is allocated to the test pulse TP3 illustrated in FIG. 3.

Figure 4:
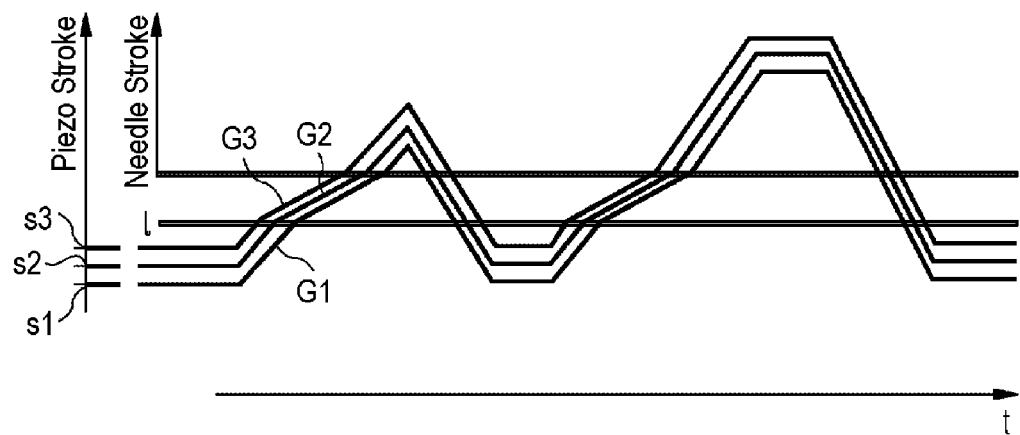
FIG. 4 is a diagram for illustrating the influence of an adjustment of the correcting variables for a subsequent fuel injection process.

FIG. 4 illustrates the influence of an idle stroke displacement on a possible fuel injection event. The figure illustrates a short electrical control similar to a possible pre-injection of fuel and a longer control with an increased needle stroke similar to a main injection of fuel.

As a consequence of a displacement from the idle stroke level s1 in the direction towards the idle stroke level s3, the quantities of fuel injected are greater. The reason for this is that with a reduction of the idle stroke level, the hydraulic fuel injection process commences earlier in relation to time. Unless this is taken into consideration in the case of the electrical control of the piezo, the nozzle needle opens further in the ballistic operation (pre-injection of fuel) and is accordingly closed later. This effect likewise occurs in the event of a non-ballistic injection of fuel (main injection of fuel) with a fully open needle unless the maximum needle stroke is limited by a limitation. On the basis of an idle stroke detection as described, it is possible with the aid of the measured time intervals of t0 to t1 or t2 or t3 to take into consideration the respective differences in the control process, as is illustrated in FIG. 4. Possible variants for maintaining uniformity of the quantities of fuel being injected are: corrections of the duration of the control process for the respective fuel injection processes, corrections of the fuel injection position, corrections by way of the piezo stroke and corrections by way of the fuel injection pressure or combinations of several of these variants.

What is claimed is:
1. A method for determining an idle travel of a piezo-injector that comprises a piezo-actuator and a nozzle needle actuated by the piezo-actuator, the method comprising:
applying a test pulse to the piezo-actuator that produces a continuous increase of a piezo stroke of the piezo- actuator, wherein the magnitude of the test pulse does not produce a needle stroke within a predefined duration of the test pulse;

wherein the test pulse comprises application of a constant value of current;

measuring the time period that passes between a commencement of the test pulse and a point at which the idle travel is overcome and the piezo-actuator impacts the pin, and determining the idle travel of the piezo-injector based on the measured time period.

2. The method of claim 1, wherein the constant value of current is provided by a control device of a motor vehicle.

3. The method of claim 1, comprising:

obtaining voltage values from the measured time period using a database, and using the obtained voltage values to control the piezo-actuator during a subsequent fuel injection process.

4. The method of claim 3, wherein the database is stored in a non-volatile manner in a storage device during the course of manufacturing the motor vehicle.

5. The method of claim 4, wherein the database stores a plurality of time periods and a respective allocated voltage value for each of a plurality of predefined system pressure values.

6. A common-rail fuel injection system of a motor vehicle, comprising:

a piezo-injector comprising a piezo-actuator and a nozzle needle actuated by the piezo-actuator, and a control system configured to:

apply a test pulse to the piezo-actuator that produces a continuous increase of a piezo stroke of the piezo-actuator, wherein the magnitude of the test pulse does not produce a needle stroke within a predefined duration of the test pulse;

wherein the test pulse comprises application of a constant value of current;

measure the time period that passes between a commencement of the test pulse and a point at which the idle travel is overcome and the piezo-actuator impacts the pin; and determine the idle travel of the piezo-injector based on the measured time period.

7. The system of claim 6, wherein the control system is configured to determine a magnitude of the test pulse such that it does not produce a needle stroke within a predefined duration of the test pulse, and applying the test pulse with the determined magnitude.

8. The system of claim 6, wherein the constant value current source is provided by a control device of a motor vehicle.

9. The system of claim 6, wherein the control system is configured to:

obtaining voltage values from the measured time period using a database accessible by the control system, and use the obtained voltage values to control the piezo-actuator during a subsequent fuel injection process.

10. The system of claim 9, wherein the database is stored in a non-volatile manner in a storage device during the course of manufacturing the motor vehicle.

11. The system of claim 10, wherein the database stores a plurality of time periods and a respective allocated voltage value for each of a plurality of predefined system pressure values.

* * * * *